Jan. 22, 1935. H. G. KNODERER ET AL 1,988,950
MACHINE FOR MANUFACTURING CABLE
Original Filed May 2, 1933
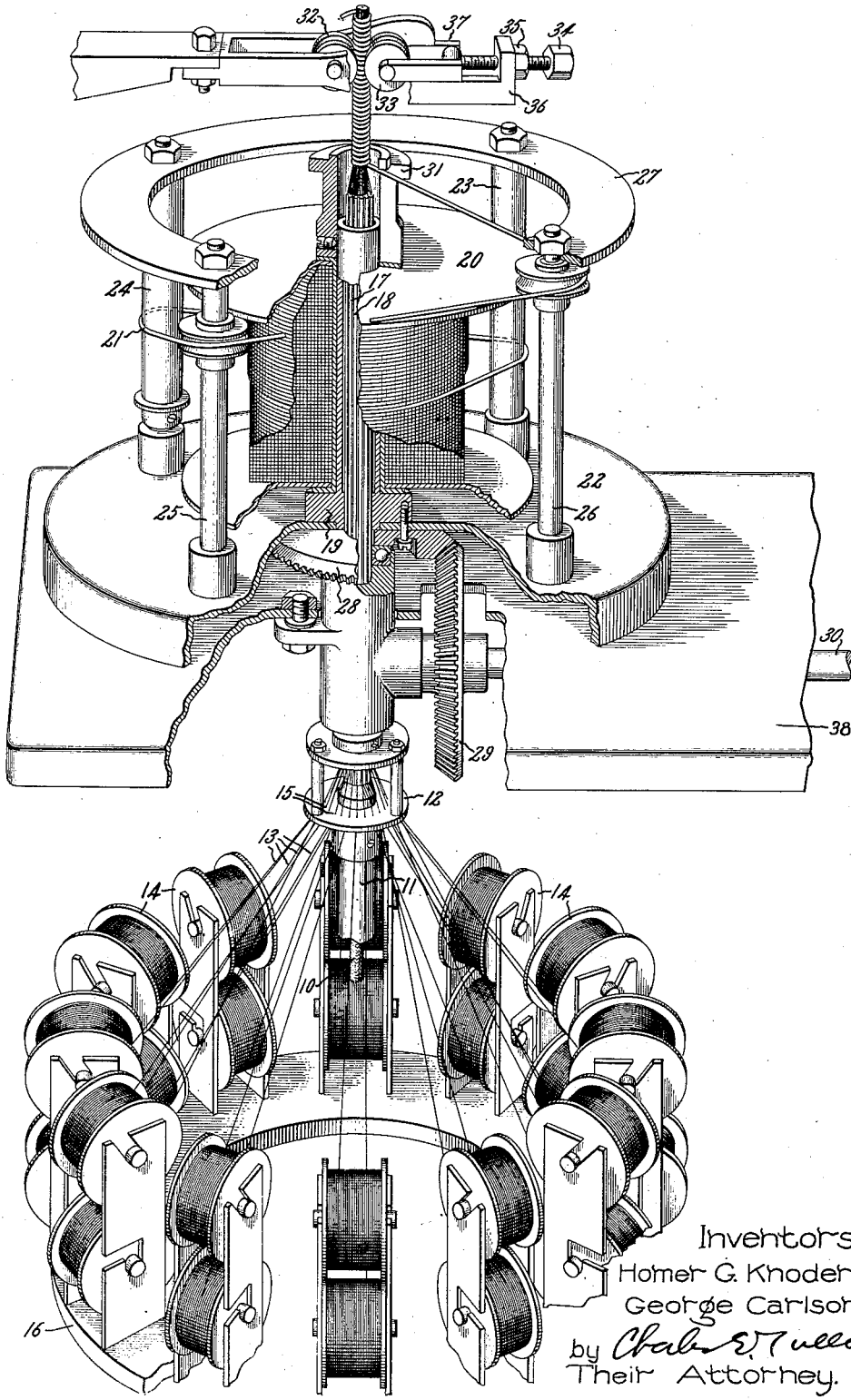
Inventors:
Homer G. Knoderer,
George Carlson,
by Charles E. Tullar
Their Attorney.

Patented Jan. 22, 1935

1,988,950

UNITED STATES PATENT OFFICE 1,988,950

MACHINE FOR MANUFACTURING CABLE

Homer G. Knoderer, Fairfield, and George Carlson, Bridgeport, Conn., assignors to General Electric Company, a corporation of New York Application May 2, 1933, Serial No. 668,992
Renewed June 6, 1934

3 Claims. (Cl. 117—41)

Our invention relates to a machine and method for manufacturing cable and more particularly to a machine for manufacturing cable with a non-interlocked armor. In the manufacture of cable with a non-interlocked armor difficulty has been experienced in placing the armor about the conductors and preventing it from subsequently unwinding or in winding it so tight about the conductors as to make it relatively inflexible and difficult to remove.

The object of our invention is to provide a machine for manufacturing armored cable which will prevent the subsequent unwinding of the non-interlocked armor and which will place the armor about an un-insulated conductor formed of strands of small diameter without injuring the stranded conductor.

What we consider to be novel and our invention will be better understood by reference to the following specification and appended claims when considered in connection with the accompanying drawing.

In the accompanying drawing, the single figure shows a perspective view of our improved machine with portions cut away to reveal other portions of the machine.

Referring to the drawing, 10 indicates an electric conductor provided with the usual covering of insulation. Conductor 10 and its insulation is passed longitudinally upward from a reel located at the bottom by means not indicated on the drawing. A tube 11 is provided through which the conductor passes to a wire guide 12. Strands 13 pass through the guide 12 from supply reels 14. Strands 13 are adapted to form a second stranded conductor about the insulated conductor 10 as will be explained later. Strands 13 pass from the reels 14 through openings 15 spaced uniformly about the axis of conductor 10 in the wire guide 12. Supply reels 14 are carried on an annular supporting member 16. Supporting member 16 and wire guide 12 are rotated in unison at a relatively low speed about the axis of conductor 10 in order to wrap the strands spirally about conductor 10 and its insulation. From the guide 12, strands 13 pass along the surface of a tube 17 in longitudinal grooves 18 which are spaced equally about the surface of tube 17. Tube 17 is secured to and adapted to rotate with wire guide 12. Around tube 17 a concentric tube 19 is located and adapted to support a reel 20 carrying a metal strip 21. The metal strip 21 is adapted to form the armor for the cable. Secured to an enlarged lower end of tube 19 is a circular plate 22 which carries four posts 23, 24, 25 and 26. The metal strip 21 is adapted to pass successively around posts 23, 24, 25 and 26. Posts 25 and 26 are provided preferably with grooved rollers to direct the metal strip to a point above the top of reel 20. An annular ring 27 is provided to secure the posts 23, 24, 25 and 26 in position. Reel 20 and support 22 are rotated by means not indicated through the intermediary of bevel gears 28, 29 and shaft 30. A guide 31 is secured to the top of tube 19 and is adapted to direct strip 21 to a point just above the top of tube 17. Strands 13 pass from the grooves at the top of tube 17 into engagement with the surface of insulation on conductor 10 and are secured thereto by means of the metal strip 21 which is wrapped about the conductor 10 and strands 13 by rotation of the reel 20 and plate 22. The speed of rotation of reel 20 is so adjusted with respect to the longitudinal advance of conductor 10 that the adjacent spirals of the metal strip are spaced apart longitudinally. The rotation of support 16 carrying the supply reels 14 for the metal strands 13 causes the strands 13 to surround conductor 10 in long pitch spirals. The speed of rotation of support 16 is relatively low as compared with the speed of rotation of reel 20 and plate 22. Preferably the support 16 will be rotated in the opposite direction from the direction in which the reel 20 and plate 22 are rotated in order to wrap the strands 13 about conductor 10 in the opposite direction from the direction in which the metal strip 21 is wound. This increases the flexibility of the cable and also makes it easier to remove the metal strip from the cable. When the metal strip 21 is wrapped about the conductor 10 and strands 13, it has a certain resiliency tending to cause it to unwind from about the combined conductors. Ordinarily, when an insulation is provided over the outside of the conductor and insulation, the armor may be wound sufficiently tight about the cable to be embedded in the insulation so that it does not readily unwind. However, when no insulation is provided on the outside conductor, it is impossible to wind the armor so tightly as it would tend to sever the small diameter strands. Also, if the armor is wound tightly about the cable it is more difficult to remove. Therefore, in order to prevent the subsequent unwinding of this relatively loosely wound metal strip 21 after the cable has been removed from the machine, the strip is deformed transversely from the circular configuration by means of grooved rollers 32 and 33 which engage opposite sides of the cable as it passes between them. Rolls 32 and 33 are held in engagement with strip 21 with a predetermined pressure which may be adjusted by means of stud 34 and lock nut 35. Rolls 32 are carried on the support 36 which is broken away in part to expose the rolls. Roll 33 is in sliding engagement with support 36 and may be adjusted with respect to roll 32 through the intermediary of yoke 37 connected to stud 34. The machine is carried on a table 38.

From the foregoing it will be seen that a method and machine for manufacturing armored cable is provided which wraps a stranded conductor about an insulated conductor and covers the assembly with an armor in one operation. This provides a simple machine and operation for manufacturing the cable and produces an improved product.

What we claim as new and desire to secure by Letters Patent of the United States, is:

1. In a machine for simultaneously applying a plurality of strands and a metal armor about an insulated conductor, the combination of a plurality of supply reels for the strands, a guide for the strands, a tube surrounding the insulated conductor and having longitudinal grooves through which the strands pass, a second tube, a carrier for a metal strip supported on the second tube, means to rotate the support for the supply reels, the guide, and the first mentioned tube in synchronism to wrap the strands about the insulated conductor in a long pitch spiral, and means to wrap the metal strip about the insulated conductor and strands in a short pitch spiral.

2. In a machine for simultaneously applying a plurality of strands and a metal armor about an insulated conductor, the combination of a plurality of supply reels for the strands, a support for the supply reels, means to rotate the support, a guide for the strands, a tube surrounding the insulated conductor and connected to the guide and having longitudinal grooves through which the strands pass, means to rotate the guide and tube with the support, a second tube, a carrier for a metal strip supported on said tube, means to rotate the tube and carrier, means to direct the metal strip to the insulated conductor and strands, and means to prevent the metal strip from unwinding after it has been wrapped spirally about the insulated conductor and strands.

3. In a machine for simultaneously applying a plurality of strands and a metal armor about an insulated conductor, the combination of a plurality of supply reels for the strands, a tube surrounding the insulated conductor and having longitudinal grooves through which the strands pass, a carrier for a metal strip, means to rotate the support for the supply reels and said tube in synchronism to wrap the strands about the insulated conductor in a long pitch spiral, and means to wrap the metal strip about the insulated conductor and strands in a short pitch spiral.

HOMER G. KNODERER.
GEORGE CARLSON.